Jan. 19, 1943.  E. S. L. BEALE  2,308,582
PRESSURE RECORDING INSTRUMENT
Filed Aug. 20, 1938  2 Sheets-Sheet 2
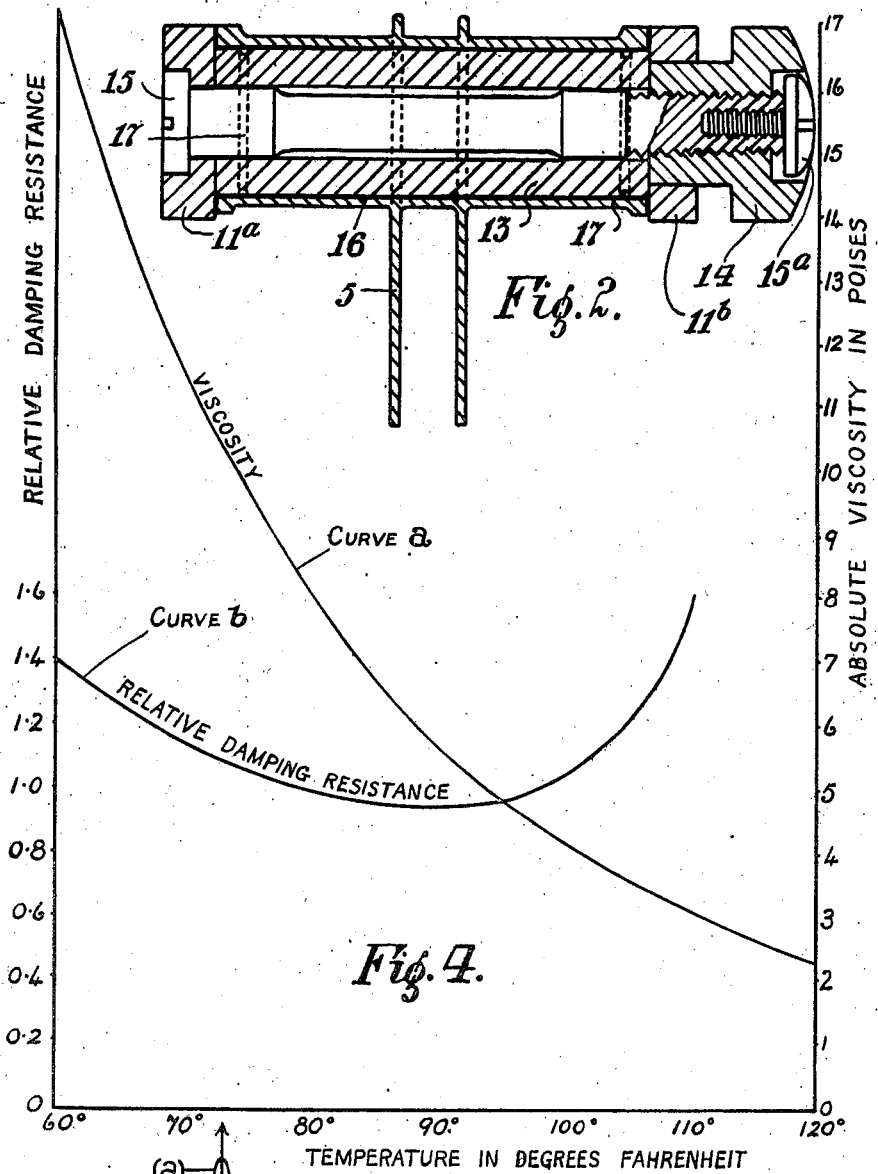
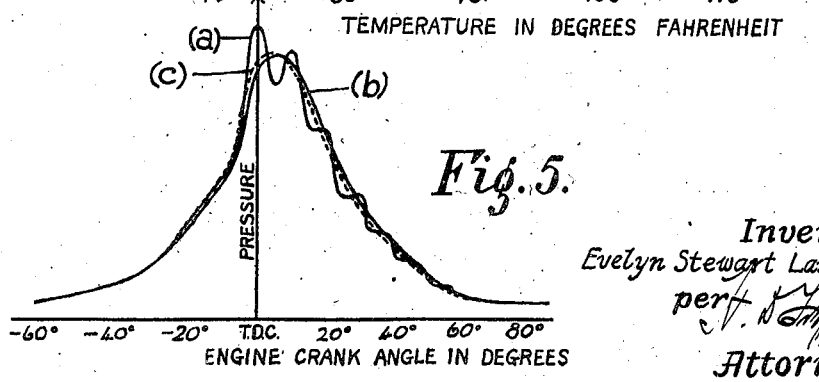
Inventor:
Evelyn Stewart Lansdowne Beale
per
Attorney.

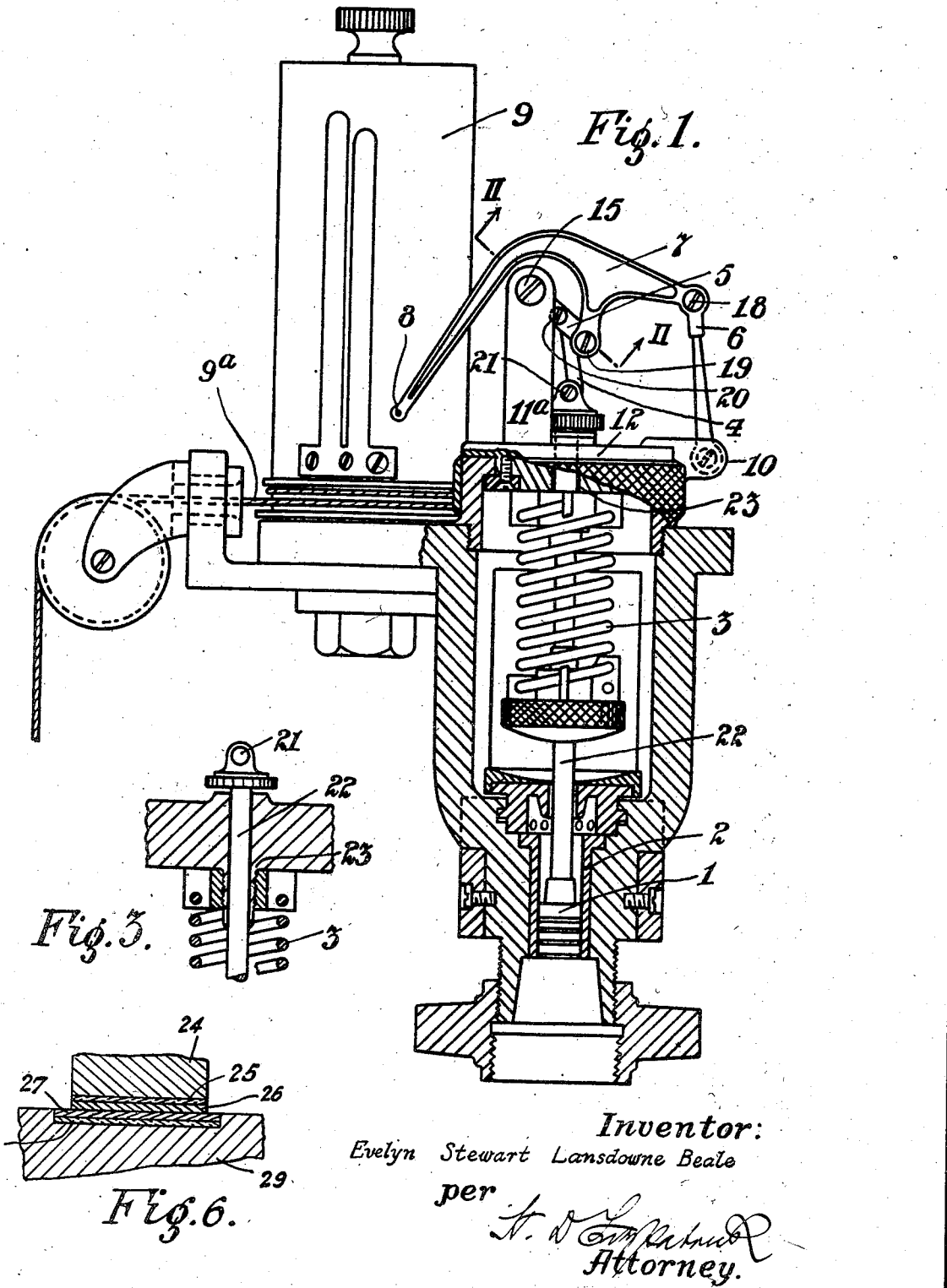

Patented Jan. 19, 1943

2,308,582

UNITED STATES PATENT OFFICE 2,308,582

PRESSURE-RECORDING INSTRUMENT

Evelyn Stewart Lansdowne Beale, London, England, assignor to Dobbie McInnes, Limited, of Glasgow Application August 20, 1938, Serial No. 225,928
In Great Britain August 24, 1937

15 Claims. (Cl. 308—120)

This invention relates to instruments for recording pressures, more particularly to damping means for damping undesired oscillations in such instruments for use under conditions in which rapid fluctuations in pressure occur and have to be recorded with accuracy, especially engine indicators for use in giving a graphic record of variation of pressure in engine cylinders, cylinders of pumps or compressors, or like pressure vessels.

The invention is especially suitable for application to engine indicators of the type comprising a piston-and-cylinder unit and a parallel-motion recording mechanism operated by the piston, said mechanism being adapted to produce a record of the varying pressures acting to move the piston in opposition to the resistance of a spring. In the construction of such instruments, it is well known that the masses forming the recording mechanism should be as light as possible and that the spring should be as stiff as possible so that the natural frequency of oscillation of the mechanical system is as high as possible with respect to the important components of the pressure variations which are to be measured. However, it is often found that, even when the masses have been reduced to a minimum and when using a spring giving a record of adequate scale, a sudden acceleration in the recording mechanism due to rapid variation in the pressure being recorded results in the production, in the outline of the record, of a distortion which frequently takes the form of a superimposed oscillation at the natural frequency of the mechanical system. Such distortion occasions difficulty in obtaining a proper analysis of the record or may conceal salient features thereof.

The object of the present invention is to provide motion-damping means whereby such distortion is removed or minimised, without introducing any substantial distortion of another well known type due to the application of an excessive amount of friction in the moving system, and thus improving the accuracy of the record.

Various known kinds of motion-damping devices such as are applied to mechanisms in general would involve certain difficulties as regards engine indicators, one difficulty being to provide an arrangement which will give the correct amount of damping (which must be entirely free from hysteresis and "sticktion", that is, static or initial friction as distinct from friction of motion) under all practical working conditions. For example the damping force due to the frictional engagement of solid elements is variable with many factors such as the load normal to the surfaces and the condition of the latter, and is different initially and when movement has commenced. Fluid displacement devices in the nature of dashpots are subject to variations in damping force due to turbulence, the formation of a partial vacuum behind the displacing member, and changes in the viscosity of the fluid with temperature.

The optimum degree of damping can be calculated for any particular system and lies between certain fairly well defined limits, and it is found that where the degree of damping lies between these limits it is one which on the one hand is effective enough to smooth the distortion and which on the other hand does not resist motion of the piston sufficiently to prevent displacement thereof rapidly to the full extent corresponding to the pressure.

In accordance with the present invention the damping force is derived from the viscous friction of a thin film of viscous fluid subjected to simple sheer. To this end the damping device has a viscous film between cooperating surfaces at which relative movement takes place when recording movement is being transmitted during the operation of the instrument due to variation in the pressure to be recorded. In order to obtain a damping force of the required value, it is necessary for the area of said cooperating surfaces, the clearance therebetween, and the viscosity of the intervening fluid to be properly correlated, as will be more fully explained hereafter. It may be noted here, however, that if a supporting bearing is constructed to form a damping device, the area of the cooperating surfaces must be substantially greater than the area that would be strictly necessary for guidance, transmitting, or supporting purposes in the case of an ordinary supporting bearing, and said surfaces must be spaced from one another at only a minute clearance substantially less than would be provided between the relatively movable lubricated surfaces of an ordinary supporting bearing in such instruments in ordinary practice.

Preferably said co-operating surfaces are in the form of inner and outer concentric cylinders subjected to relative movement about their common axis, said cylinders being of substantially elongated formation and/or of substantially enlarged diameter as compared with a similar construction designed purely as a bearing.

The area of said surfaces, the space between them and the viscosity of the fluid are so chosen by calculation and experiment that the fluid or viscous friction produced is sufficiently large to damp out free oscillation of the moving parts and to prevent overswing of these parts due to their inertia and sufficiently small to allow the moving parts freely to follow and properly record rapid fluctuations of pressure. Means subject to viscous friction as distinct from solid or turbulent friction are selected to apply the necessary damping because the frictional damping force is rendered directly proportional to velocity; so that the coefficient of damping or, to use an electrical analogy, the damping "resistance," is constant and independent of the frequency.

As the viscous damping force resulting between the cooperating surfaces under the present invention is proportional to the speed of movement of the surfaces relative to each other, there is high damping force at high speeds and low damping force at low speeds, for example, at the apex of a wave-form movement there is no resistance (the velocity momentarily being zero). It follows that, in order to obtain maximum efficiency of the damping, the relative movement of the surfaces should be unidirectional while the pressure responsive element is moving continuously in one direction, whilst the velocity of the said relative movement should preferably have at least a roughly constant ratio to the velocity of the pressure responsive element. Such conditions ensure that the damping force is highest when the pressure is rising most rapidly, which tends to prevent the mechanism overshooting due to inertia and registering too high a maximum pressure or a superimposed oscillation. Clearly, when the direction of movement of the surfaces changes, the damping force momentarily falls to zero, so that such change should take place when the pressure responsive element is stationary. With solid friction, the damping force depends on the load and is independent of the speed except in so far as the load depends on the speed, due, for example, to inertia.

The aforesaid surfaces may be coaxial cylindrical surfaces presented by a pin and a closely fitting sleeve between which relative turning motion takes place about their common axis.

The pin and the sleeve mentioned above are preferably made of materials having different coefficients of thermal expansion carefully selected with regard to the dimensions and the properties of the fluid to be used, so that the damping force for a given velocity is maintained substantially constant over the working range of temperature of the pin and sleeve. Since the coefficient of viscosity of all fluids decreases with a rise of temperature the clearance space between the pin and sleeve must clearly decrease with rise of temperature if the damping force for a given velocity is to remain constant. The coefficient of thermal expansion of the pin must therefore clearly be greater than that of the sleeve.

Embodiments of the invention will now be described, by way of example, with reference to the accompanying drawings, whereon:

Fig. 1 shows a part sectional elevation of one type of engine indicator embodying a damping device according to the invention, the device in this case also serving as a bearing.

Fig. 2 shows (on an enlarged scale) a cross section of the damping bearing embodying the invention, on the line II—II of Fig. 1.

Fig. 3 illustrates, as a possible modification, a sectional view of a detail of Fig. 1.

Fig. 4 shows two graphs illustrating the results obtained from temperature compensation investigations.

Fig. 5 shows reproductions of indicator diagrams on an engine crank angle degree base, obtained (a) without, and (b) with, use of the invention.

Fig. 6 is a fragmentary sectional view of the coacting surfaces in a damping device of my invention employing heat insulating means.

The well known type of indicator illustrated in Fig. 1, incorporates a piston 1 operating within a cylinder 2 which is connected by known means to the source of fluctuating pressure to be recorded, for example, to the cylinder of an engine. The piston travel is controlled by a calibrated spring 3, the deflection of which provides a measure of the pressure acting on the piston, and it is magnified by means of a parallel motion mechanism formed of properly proportioned links (or arms) 4, 5, 6 and recording arm 7. A pencil or pen 8 fitted near one end of the recording arm enables a visual diagram to be obtained upon a receptive surface such as recording paper placed upon a recording drum 9 oscillated by a cord 9a. The parallel motion is pivoted at two anchorages formed at axes, one within a projection or bracket 10 and the other near the upper ends of two stanchions 11a and 11b (Fig. 2), which bracket and stanchions are part of a platform 12 fixed to the body of the indicator although it may be moved about a vertical axis extending through the piston.

Under the present invention there is an unusually large and long cylindrical pin 13, which is clamped stationarily to stanchion 11a and between the stanchions 11a and 11b by a thumb nut 14 and bolt 15 which latter has a semi-permanent retaining screw 15a to prevent accidental removal and loss of the nut 14. The pin 13 has a substantial outer surface which is separated by a minute inter-surface clearance space from the similarly substantial inner surface of a large elongated hollow-cylindrical sleeve 16 forming part of the link (or arm) 5 of the parallel motion mechanism.

The size of the co-operating surfaces of pin 13 and sleeve 16 is much greater than that strictly necessary for merely guidance purposes, as will be evident from the dimensions hereinafter given. Similarly the inter-surface clearance between these parts is much smaller than that normally provided in bearings for instruments of this kind. The said clearance space receives or is adapted to receive a film of viscous fluid the retention of which within the clearance space is assisted by the presence of two grooves or traps 17 turned in the outer surface of pin 13, one near each end.

During the operation of the instrument, relative turning motion takes place between the coaxial cylindrical surfaces of pin 13 and sleeve 16 due to variation in the pressure to be recorded. The said surfaces are preferably embodied in the parallel motion at a pivot or joint having a stationary location in order that the mass of the cylindrical members shall not appreciably increase the inertia of the system when in motion, and at a pivot having a large relative movement between the pivoted part and its anchorage so that the relative velocity of said members is a maximum. To this end, in the example described, the anchorage at 15 is selected in preference to the pivots 18, 19, 20, or 21 and to the anchorage at 10 because the anchorage 15 has a stationary location and because the angular movement of the link or arm 5 (carrying the sleeve 16) relative to the pin 13 is large, and in preference to the pivots 10, 18, 19, and 21 also because the movement of these is not unidirectional during movement of the pencil 8 in one direction.

It will be obvious, of course, that it is not essential for the damping device to act also as a bearing. That is a matter of convenience, but it could equally as well be provided as a separate device not performing the functions of a bearing.

In one example of the arrangement shown in the drawings the value of the clearance space between surfaces of conveniently large area was determined as follows:

It was realised that the complex assembly of moving parts consisting of the piston, parallel motion mechanism and members affixed thereto could for the purposes of calculation be assumed replaced by a single mass M, say, actuated by the varying pressure to be recorded and controlled by the spring, the "compliance" (which is the reciprocal of rate or strength) of which was denoted by C units of displacement per unit of force applied. The resonant frequency of the system, therefore, $$f_r = \frac{1}{2\pi \sqrt{MC}} \text{ cycles per second} \quad (1)$$

At this frequency, the amount by which movement is impeded by M is equal to that due to C, or the impedance $$Z_r = 2\pi f_r M = \frac{1}{2\pi f_r C} \quad (2)$$

At any other frequency, $mf_r$, the impedance of M and C together $$Z_m = \left(m - \frac{1}{m}\right) Z_r \quad (3)$$

Now, by electrical analogy, the velocity of motion $$I = \frac{E}{\sqrt{R^2 + \left(2\pi f_r M - \frac{1}{2\pi f_r C}\right)^2}} \quad (4)$$

where E is the force producing the motion and R is the resistance, using the term "resistance" to mean the mechanical equivalent of electrical resistance, i. e., the ratio of damping force to relative velocity.

If the ratio of R to $Z_r$ be denoted by $a$, then, from (3) and (4):

$$I = \frac{E}{Z_r} \times \frac{1}{\sqrt{a^2 + (m - 1/m)^2}} \quad (5)$$

At very low frequencies, when $m$ is very small, $$I_o = \frac{E}{Z_r} m \quad (6)$$

which provides the condition under which the moving parts of the indicator would follow the pressure variation exactly. From (5) and (6), $$\frac{I}{I_o} = \frac{1}{m \sqrt{a^2 + \left(m - \frac{1}{m}\right)^2}} \quad (7)$$

which when graphically plotted on a base of $m$, for various values of $a$ enables the optimum value of "$a$" to be chosen such that the ratio $I/I_o$ which represents the ratio of the actual response to pressure variation of the moving parts of the ideal response is maintained as close to unity as possible over the important range of frequencies encountered in practice. This graphical plotting shows that the optimum value of "$a$" is in the region of 1.4. The limits for the optimum degree of damping for any particular system have been found in practice to correspond to values of the ratio "$a$" substantially between 1 and 2.

The required resistance R was then found by multiplying the value of $a$ so chosen by the value of $Z_r$ found from Equation 2.

Since this resistance R is applicable for damping the equivalent single mass M at some position along the axis of the piston 1 and as it is desired to apply damping at the anchorage 15, a proportionate adjustment is made such that the resistance at the surfaces of the pin 13 and sleeve 16

$$R_a = kR$$

where $k$ is a constant of the instrument and is equal to the square of the ratio of the velocity of the piston 1 to the relative velocity of the surfaces of the pin 13 and sleeve 16 at mid-travel. In a case such as is illustrated in Fig. 3, the value of $k$ thus becomes unity.

The dimensions of the largest pin and sleeve which could conveniently be accommodated in practice were determined from which the area A, say, of either of the two surfaces was found. From the formula, $$t = \frac{A\eta}{R_a}$$

where
$t$ = radial distance between surfaces
$\eta$ = viscosity of viscous fluid separating the surfaces, the minute inter-surface clearance space was found.

In the example illustrated in Fig. 2, the following values were obtained:

M = 41 grams.
C = $.0106 \times 10^{-6}$ cm. per dyne.
$f_r$ = 245 cycles per second.
$Z_r$ = 62,000.
$a$ = 1.4.
R = 87,000 mechanical "ohms."
$k$ = 2.5.
$R_a$ = 215,000 mechanical "ohms."

In practice, in the above example, the length of sleeve 16 was 2.9 cm. and its inside diameter 1 cm., so that the area A = 9.1 square cm. By application of the formula for "$t$," it is found that $t = 3.4 \times 10^{-4}$ cm. when using a viscous fluid having a viscosity ($\eta$) of 8 poises. Hence all the dimensions of the bearing are fixed and have practicable values. For comparison, in the same instrument, but without the present invention, in a simple pin bearing as hitherto utilised, the length of the bearing hole surface carrying the bearing pin was about 0.56 cm., the inside diameter of the bearing hole 0.226 cm., and $$t = 89 \times 10^{-4} \text{ cm.}$$

In the example described, it was decided to obtain accurate temperature compensation of the damping resistance with variation of the temperature in the space between pin and sleeve, within practical limits over a temperature range of 80° F. to 100° F.; and comparing the desired relative coefficient of expansion of the pin 13 and the sleeve 16 with the reduction in viscosity of the viscous fluid over the same temperature range, it was found necessary to employ a material such as "invar" for the sleeve and a material such as aluminium or an aluminium alloy for the pin. With "invar" and an aluminium alloy, a differential coefficient of expansion of about $24 \times 10^{-6}$ per degree centigrade was obtained.

In Fig. 4, which represents a typical result of investigations into the temperature compensation problem, curve a shows the relationship between the viscosity and temperature of one viscous fluid used; curve b shows the variation of the relative damping resistance with temperature from which curve it was noted that within the temperature range selected, the resistance was constant for all practical purposes.

Minutely spaced surfaces of substantial area, in an instrument according to the invention, could be presented instead by parts between which sliding motion occurs. For example, referring to Fig. 3, such parts may be the piston rod 22 and its guide sleeve 23 in an engine indicator of the piston type or in one capable of being fitted with a rod and guide. In this case, the resistance to be applied is equal to the value of $R=aZ_r$ instead of $R_a$ hereinbefore referred to. This enables the attainment of suitable sizes of the co-operating surfaces of rod 22 and sleeve 23 and their clearance. In this arrangement it is desirable that the viscous fluid be prevented from attaining too high a temperature, and this may be aided, in the manner illustrated generally in Fig. 6, by fitting on to the piston rod a mica sleeve (for heat insulation), and thereon an outer metal sleeve. Similarly the interior of the bearing in 23 may be equipped with alternate mica and metal sleeves.

Fig. 6 illustrates in a general manner the arrangement of a heat insulating mica lamination 25 interposed between member 24 and the outer lamination 26 which provides a bearing or damping surface coacting with the bearing or damping surface 27 which is provided by a lamination separated from the supporting member 29 by a layer 28 of heat insulating mica. Elements 26 and 27, providing the bearing or damping surfaces between which a viscous fluid is maintained, may be secured to the respective backing members 24 and 29 in any suitable manner, as by shrinking in the case of a cylindrical form, as above noted.

Fig. 5 shows two examples of the type of diagram obtained at an engine speed of 390 revolutions per minute and under certain compression-ignition engine conditions productive of a high rate of increase of pressure with respect to time, at the commencement of burning of the oil fuel, one diagram (a) being taken with an indicator of the type discussed which was not fitted with the aforesaid pin and sleeve ($a=R/Z_r=0.1$) and the other (b) taken with the same type of indicator fitted with the pin and sleeve in accordance with the invention ($a=1.4$). The ideal or true diagram is shown as a dotted line (c). It will be noted that the diagram (b) shows a smooth outline resulting from freedom from oscillation of the moving parts of the instrument, and accuracy, for all practical purposes, of the indication of the compression and maximum pressures. There is also introduced a small but definite time lag or bodily displacement of the diagram from its true position. This lag could theoretically be compensated by introducing the same lag in the driving mechanism of the recording drum. However, for practical purposes this lag can be ignored, as it is the same order of magnitude as other unavoidable inaccuracies in phasing of the diagram. It should be noted that since, for the sake of clarity, these diagrams are of the crank angle base type, for which the recording drum is driven by the engine at crankshaft speed, it is common practice to drive the drum indirectly from the engine piston and in such circumstances the friction of the oscillating drum renders the aforesaid lag negligible.

An important additional result of the elimination of oscillation illustrated by the waves shown on the diagram of Fig. 5 is that during operation of the instrument the stresses in the links and pivots forming the parallel motion are very considerably reduced thus making for higher resistance to wear and tear and for longer life of the instrument.

When it is desired to obtain with an engine indicator a diagram of low fluctuating pressures—a diagram of the type known as a "light spring diagram"—the same degree of damping is not required and we therefore provide for releasing the pin 13, by screwing back the thumb nut 14, so that the pin revolves with the sleeve 16 about the bolt 15, the clearance between which bolt and the inner surface of the pin 13 being larger than that between the pin and the sleeve and filled with an ordinary lubricating oil instead of the viscous fluid described.

As a further example of the dimensions of a bearing similar to that shown in Fig. 2, for a larger mass M, the length of the sleeve and pin is about one and one-quarter inches and their diameter is about one-half inch, the radial clearance space between the cylindrical surfaces of the pin and sleeve being about .00006 of one inch. The viscous fluid may be a heavy lubricating oil such as would not ordinarily be used for the lubrication of instruments—an example of suitable fluid is a mineral lubricating oil having a viscosity of about 150 centipoises at 100° F.

The invention is, as aforesaid, also applicable to pressure-recording instruments other than engine indicators of the type stated; for example, to engine indicators of the optical type, and to recording pressure gauges of the Bourdon tube type and diaphragm type. Gauges as aforesaid are also subject to the defects and difficulties hereinbefore described with reference to engine-indicators, since on the one hand the recording mechanism of such gauges should be as light as possible and on the other hand the tube or diaphragm should be as stiff as possible.

In the following claims the expression "large-area," as used with reference to the cooperating surfaces such for example as those of the pin 13 and sleeve 16 in Fig. 2 and those of the rod 22 and sleeve 23 in Fig. 3, means that those surfaces are substantially larger than would be necessary were they used merely for bearing or guiding purposes, and the expression "minute" as applied to the radial size of the clearance between said surfaces means that the clearance is substantially less than would be necessary were it used to receive a fluid serving merely as a lubricant.

I claim:

1. In a pressure recording instrument, a bearing between cooperating surfaces of which relative movement takes place during the operation of the instrument; said bearing comprising a hollow pin affording externally one of said surfaces and internally another of said surfaces, an outer hollow sleeve fitting over said pin and affording internally a bearing surface cooperative with the external bearing surface of said hollow pin, said outer sleeve being connected to a moving part of the recording mechanism, and bolt means extending through the interior of, and affording a bearing surface for the internal bearing surface of said hollow pin; said bolt means being adjustable with respect to said hollow pin to anchor said pin independently of the outer sleeve when said bolt means are tightened, whereby relative turning movement takes place between said pin and sleeve, and to free said pin to allow it to turn together with the sleeve relative to said bolt means when said bolt means are loosened, thereby enabling the clearance between either the sleeve and the pin, or the pin and the bolt means, to constitute the effective clearance of the bearing.

2. In a pressure recording instrument, a bearing between cooperating surfaces of which relative movement takes place during the operation of the instrument; said bearing comprising an inner part, an intermediate part taking its bearing on said inner part, and an outer part taking its bearing on said intermediate part, said relative movement being required between said inner and outer parts, and locking means for locking said inner and intermediate parts together so as to enable the clearance between the intermediate and outer parts to constitute the effective clearance of the bearing, said locking means being releasable for providing a relatively greater clearance between said inner and intermediate parts as the effective clearance of said bearing.

3. In a pressure recording instrument, means for damping free oscillation of the recording element, when required, comprising a bearing between cooperating surfaces of which relative movement takes place during the operation of the instrument; said bearing comprising an inner part, an intermediate part taking its bearing on said inner part, and an outer part taking its bearing on said intermediate part, and having a viscous fluid between said intermediate and outer parts; and locking means for locking said inner and intermediate parts together and operable to release them, as required, so as to enable the clearance between either the inner and intermediate parts, or the intermediate and outer parts, to constitute the effective clearance of the bearing; the area of and clearance between the cooperating surfaces of said outer and intermediate parts and the viscosity of the fluid therebetween being so correlated that when the inner and intermediate parts are locked together a damping resistance is produced which is effective to substantially wholly suppress free oscillations in said recording element.

4. In a pressure recording instrument, means for damping high frequency free oscillations from the recording mechanism comprising the combination of inner and outer viscous-frictional elements, said elements respectively presenting cooperating large-area surfaces spaced apart to provide between them a minute annular clearance, a viscous fluid in said clearance to exercise a damping resistance between said surfaces, means maintaining one of said elements at rest and means connecting said other element to said mechanism so that on the occurrence of to-and-fro motion thereof a to-and-fro motion occurs between said surfaces, said elements being respectively made of different materials and the co-efficient of thermal expansion of the outer element being so much less than that of the inner element that on diminution of the viscosity of said fluid due to rise in its temperature said minute clearance is proportionately diminished to maintain said damping resistance approximately constant.

5. In a pressure recording instrument, means for damping high frequency free oscillations from the recording mechanism comprising the combination of inner and outer viscous-frictional elements, said elements respectively presenting cooperating large-area surfaces spaced apart to provide between them a minute annular clearance, a viscous fluid in said clearance to exercise a damping resistance between said surfaces, and means for effecting a to-and-fro relative motion between said elements on occurrence of to-and-fro motion of said mechanism, said elements being made of materials respectively so selected as regards thermal expansion properties and with reference to the viscosity properties of the fluid that under changing temperature conditions said elements automatically control the minute size of the clearance and thereby maintain said damping resistance approximately constant.

6. In a pressure recording instrument, means for damping high frequency free oscillations from the recording mechanism comprising the combination of inner and outer viscous-frictional elements respectively presenting cooperating large-area coaxial cylindrical surfaces, said surfaces being spaced apart to provide between them a minute annular clearance, a viscous fluid in said clearance to exercise a damping resistance between said surfaces, means maintaining one of said elements at rest and means connecting said other element to said mechanism so that in the operation thereof to-and-fro angular motion occurs between said surfaces about their common axis, said elements being respectively made of different materials and the co-efficient of thermal expansion of the outer element being so much less than that of the inner element that on diminution of the viscosity of said fluid due to rise in its temperature said minute clearance is proportionately diminished to maintain said damping resistance approximately constant.

7. In a pressure recording instrument, damping means as set forth in claim 4 wherein the area of said surfaces, the clearance therebetween and the viscosity of the fluid are so correlated that the amount of damping, namely the ratio $R/Z_r$ in which R is the actual viscous frictional resistance with respect to said recording mechanism and $Z_r$ is the impedance to motion at the resonant frequency of the recording mechanism, has the value 1.4 approximately, at which value high frequency oscillations of the recording mechanism are substantially eliminated and there is no material interference with the formation of a normal record.

8. In a pressure recording instrument, damping means as set forth in claim 5 wherein the area of said surfaces, the clearance therebetween and the viscosity of the fluid are so correlated that the amount of damping, namely the ratio $R/Z_r$ in which R is the actual viscous frictional resistance with respect to said recording mechanism and $Z_r$ is the impedance to motion at the resonant frequency of the recording mechanism, has the value 1.4 approximately, at which value high frequency oscillations of the recording mechanism are substantially eliminated and there is no material interference with the formation of a normal record.

9. In a pressure recording instrument, means for damping high frequency free oscillations from the recording mechanism comprising the combination of inner and outer viscous-frictional elements, said elements respectively presenting cooperating large-area surfaces spaced apart to provide between them a minute annular clearance, a viscous fluid in said clearance to exercise a damping resistance between said surfaces, and means for effecting a two-and-fro relative motion between said elements on occurrence of to-and-fro motion of said mechanism, the area of said surfaces, the clearance therebetween and the viscosity of the fluid being correlated to give an amount of damping, namely the ratio $R/Z_r$ in which R is the actual viscous frictional resistance with respect to said recording mechanism and $Z_r$ is the impedance to motion at the resonant frequency of the recording mechanism, having the value 1.4 approximately, at which value high frequency oscillations of the recording mechanism are substantially eliminated and there is no material interference with the formation of a normal record.

10. In a pressure recording instrument, damping means as set forth in claim 4 wherein the difference between the coefficients of expansion of the respective said materials is of the order of $24 \times 10^{-6}$ per degree centigrade.

11. In a pressure recording instrument, damping means as set forth in claim 9 wherein the difference between the coefficients of expansion of the respective said materials is of the order of $24 \times 10^{-6}$ per degree centigrade.

12. In a pressure recording instrument, means for damping high frequency free oscillations from the recording mechanism comprising the combination of inner and outer viscous-frictional elements respectively presenting cooperating large-area coaxial cylindrical surfaces, said surfaces being spaced apart to provide between them a minute annular clearance, a viscous fluid in said clearance to exercise a damping resistance between said surfaces, means maintaining one of said elements at rest and means connecting said other element to said mechanism so that in the operation thereof to-and-fro angular motion occurs between said surfaces about their common axis, the area of said surfaces, the clearance therebetween and the viscosity of the fluid being correlated to give an amount of damping, namely the ratio $R/Z_r$ in which R is the actual viscous frictional resistance with respect to said recording mechanism and $Z_r$ is the impedance to motion at the resonant frequency of the recording mechanism, having the value 1.4 approximately, at which value high frequency oscillations of the recording mechanism are substantially eliminated and there is no material interference with the formation of a normal record.

13. In a pressure recording instrument, damping means as set forth in claim 4 including also heat insulating means at said cooperating surfaces for heat insulating said viscous fluid between said surfaces.

14. In a pressure recording instrument, means for damping high frequency free oscillations from the recording mechanism comprising the combination of inner and outer viscous-frictional elements respectively presenting cooperating large-area coaxial cylindrical surfaces, said surfaces being spaced apart to provide between them a minute annular clearance, a viscous fluid in said clearance to exercise a damping resistance between said surfaces, means maintaining one of said elements at rest and means connecting said other element to said mechanism so that in the operation thereof to-and-fro linear motion occurs between said surfaces along their common axis, said elements being respectively made of different materials and the co-efficient of thermal expansion of the outer element being so much less than that of the inner element that on diminution of the viscosity of said fluid due to rise in its temperature said minute clearance is proportionately diminished to maintain said damping resistance approximately constant.

15. In a pressure recording instrument, means for damping high frequency free oscillations from the recording mechanism comprising the combination of inner and outer viscous-frictional elements respectively presenting cooperating large-area coaxial cylindrical surfaces, said surfaces being spaced apart to provide between them a minute annular clearance, a viscous fluid in said clearance to exercise a damping resistance between said surfaces, means maintaining one of said elements at rest and means connecting said other element to said mechanism so that in the operation thereof to-and-fro linear motion occurs between said surfaces along their common axis, the area of said surfaces, the clearance therebetween and the viscosity of the fluid being so correlated that the amount of damping, namely the ratio $R/Z_r$ in which R is the actual viscous frictional resistance with respect to said recording mechanism and $Z_r$ is the impedance to motion at the resonant frequency of the recording mechanism, has the value 1.4 approximately, at which value high frequency oscillations of the recording mechanism are substantially eliminated and there is no material interference with the formation of a normal record.

EVELYN STEWART LANSDOWNE BEALE.